I. BARTON.
Tubular-Boiler.
No. 169,225.  Patented Oct. 26, 1875.
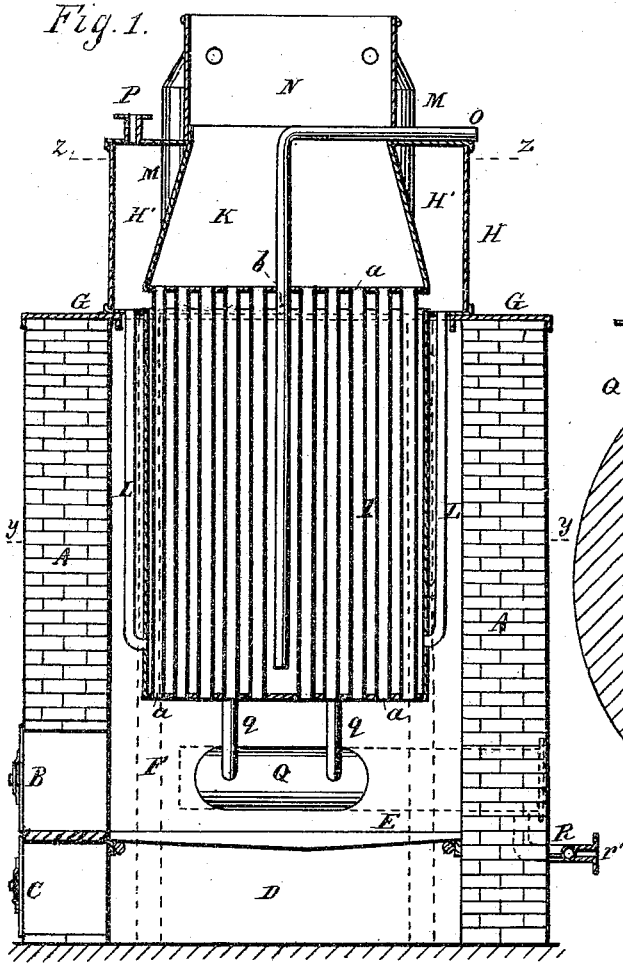
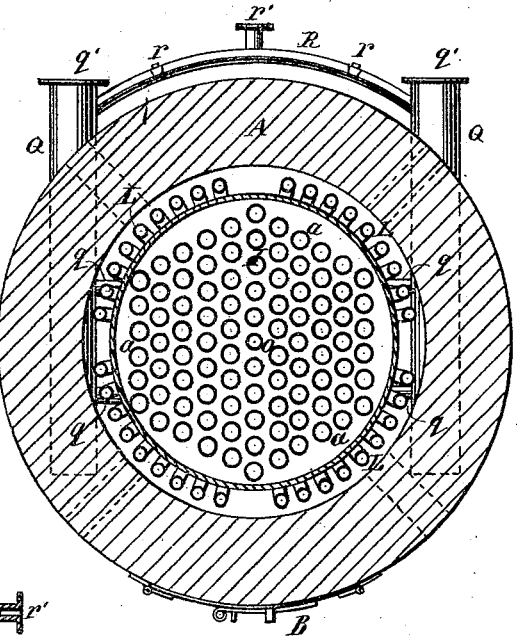
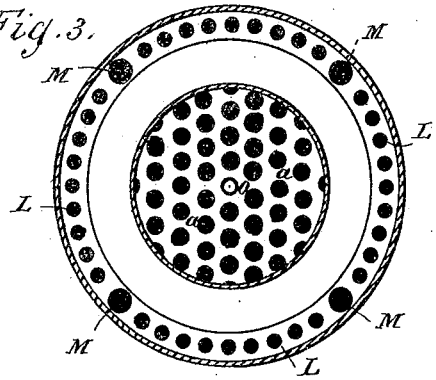
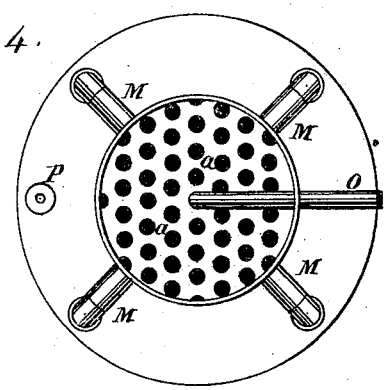
Witnesses:
Charles Thurman
R. N. Dyer
Inventor:
Isaac Barton
by Geo. W. Dyer
atty

UNITED STATES PATENT OFFICE.

ISAAC BARTON, OF WILLIAMSPORT, PENNSYLVANIA.

IMPROVEMENT IN TUBULAR BOILERS.

Specification forming part of Letters Patent No. 169,225, dated October 26, 1875; application filed April 12, 1875.

*To all whom it may concern:*

Be it known that I, ISAAC BARTON, of Williamsport, in the county of Lycoming and State of Pennsylvania, have invented new and Improved Steam-Boilers; and I do hereby declare that the following is a full and exact description of the same, reference being had to the accompanying drawings and to the letters of reference marked thereon.

The object I have in view is the construction of a cheap and economical vertical tubular boiler which shall combine simplicity and durability, occupy small space, possess a great area of heating-surface and water-space, allow the freest circulation of heat and water, require a very small amount of fuel, and overcome the difficulty which obtains in the ordinary vertical tubular boilers of allowing the heat to pass directly through the tubes and into the smoke-stack at a high temperature; and my invention therein consists in making my boiler of two cylinders having a common axis, the shorter and upper, called the drum, having the greater diameter, and serving as a flange to suspend the boiler in an outer casing of brick-work, upon the top of which the lower plate of the said drum rests, and thus allows the products generated in a fire-place in the lower part of said casing to rise through the tubes and around the exterior of the lower and smaller cylinder, called the pot of the boiler, which is provided with vertical tubes open at the bottom to receive the heat and products of combustion, and open at the top into a combustion-chamber of a frusto-conical shape, which is formed inside of the drum before mentioned, having for its base the top sheet of the pot, and opening at its top into the smoke-stack; and further, in combination with said pot and drum, a series of pipes leading from the lower part of the water-space of said pot inside of said casing to the base of said drum, which projects beyond the pot, and connecting with the water-space in the same, said pipes being alternately long and short, and entering the pot in different planes, so as not to weaken its shell; and further, in the combination with said drum, of a series of smoke-flues which pass vertically through it near its outer periphery and carry the products of combustion which rise outside and around the pot into the smoke-pipe; and further, in combination with said cylinder, a blow-out pipe which extends down through the combustion-chamber and the water-space nearly to the bottom sheet of the pot to take off the sediment that may accumulate there, and is provided with holes near the water-line, to serve as a surface blow; and further, in the combination of two flues, which are partly inserted in the brick-casing before mentioned on either side of and below the pot of the boiler with the pot with which they connect by means of small pipes, said flues extending from the casing on the side opposite to the furnace-doors, and being provided on their outer extremities with hand-hole plates, and being connected outside the boiler by a pipe provided with valves which pass from one to the other, said flues being used to allow the sediment which deposits in them to be easily cleaned out, and by the proper manipulation of the valves and hand-hole plates the boiler may be thoroughly cleansed by pumping water on one side and blowing out on the other; and further, in combination with the said brick casing, a plate which rests upon its top, and which sustains the boiler, and which is in turn sustained by the brick casing, or by the brick casing and four iron columns, as shown by dotted lines in Figs. 1 and 2 of the drawing, which extend down through the casing and allow the latter to be taken down without affecting the position of the boiler, all as is more fully hereinafter explained.

To enable others skilled in the art to make and use my invention, I now proceed to describe the same in connection with the drawings, in which—

Figure 1 is a vertical central section of my boiler and casing; Fig. 2, a horizontal section on line $y\ y$ of Fig. 1; Fig. 3, a horizontal section on line $z\ z$; Fig. 4, a top view of boiler with smoke-stack off.

Similar letters denote like parts in each figure.

In the drawings, A denotes a cylindrical brick casing, provided with furnace-doors B and ash-pit doors C. The ash-pit is denoted by D, the grate by E, and the fire-place by F. On the top of the casing A rests a plate, G, upon which rests the drum H of the boiler. The pot of the boiler is of less diameter than the drum, and hanging from it is denoted by I, and pierced by vertical tubes $a$, which allow the heated gases to pass from the fire-place F into the combustion-chamber K. L L are pipes, which pass from the lower part of the pot into the base-plate of the drum H, and promote the circulation of the water. M are smoke-flues, which lead the heated gases, which rise outside and around the pot through the drum H into the smoke-stack N, thus further utilizing the heat by superheating the steam in the drum H. H′ is steam and water space in the drum H. O is a blow-off pipe extending from near the bottom sheet of the pot I, and pierced with holes at the water-line $b$, to serve as a surface blow-off. P is the flange for the steam-pipe. Q are flues on each side of the fire-place, connecting with the water-space in the pot by pipe $q$, and provided with hand-hole plates $q'$ $q'$. R is a pipe connecting the flues Q, and provided with valves $r$ $r$, to control the passage of the injection or ejection of water to and from the boiler, and a flange, $r'$, to connect with the feed-pipe.

With a slight change in construction this boiler could be used with a sheet-iron casing, instead of the brick casing described, without departing from the spirit of my invention.

I am aware that flues have been placed in the casing of a boiler connected to said boiler by pipes, and provided with hand-holes, and used for collecting the sediment from the boiler; but such flues were not constructed like mine; nor had they the valves by which my flues can be used to thoroughly clean the boiler, by closing one valve and removing the hand-plate on that flue thus shut off from the feed-water, the feed-water being pumped in on one side, and allowed to run out on the other.

Having thus described my invention, what I claim as new, and desire to secure by Letters Patent, is—

1. In combination with a suspended vertical tubular boiler, composed of two cylinders having the same axis, the lower pierced by tubes for the passage of the heated gases, and the upper, of larger diameter, containing the combustion chamber, and serving as a steam-drum, a blow-out pipe leading from near the bottom sheet of the boiler-pot, and pierced near the water-line with holes, to serve as a surface-blow, substantially as described and shown.

2. In combination with a vertical tubular boiler, two flues, Q, placed below it on each side of the fire-place, and connected with the water-space in said boiler by small pipes $q$, and further provided with hand-hole plates $q'$, pipe R, and valves $r$ $r$, substantially as described and shown.

3. In a vertical tubular boiler, the combination of two flues, Q Q, set into the brick casing, one on each side below the pot of the boiler, and connected to said pot by the pipes $q$ $q$, said flues having one end projecting beyond the outer part of said brick casing, and connected by a pipe, R, the pipe R being provided with a connection, $r'$, for connecting with the feed-water pipe, and suitable valves for shutting off the supply to one or both flues, substantially as described and shown.

4. In a vertical tubular boiler, the combination of the following elements, viz: a tubular brick casing, a tubular boiler wholly contained, and suspended within the same, a grate below said boiler, and between the bottom of the same and the bottom of the tubular casing, a drum resting upon the top of said casing, and a free, open space between the sides of the boiler, and the inner wall of the casing, substantially as described and shown.

5. A vertical tubular boiler, suspended by its upper part H on a plate, G, said plate resting upon a series of iron columns, which extend down through, and are entirely inclosed in, a cylindrical brick casing A, so that said brick casing may be taken down without disturbing the position of the boiler on said plate G, substantially as described and shown.

This specification signed and witnessed this 9th day of March, 1875.

ISAAC BARTON.

Witnesses:
 J. ENTERMARKS,
 I. N. SMITH.